US007764949B2

(12) United States Patent
Suh et al.

(10) Patent No.: US 7,764,949 B2
(45) Date of Patent: Jul. 27, 2010

(54) METHOD OF PREVENTING REPLAY ATTACK IN MOBILE IPV6

(75) Inventors: Kyung-Joo Suh, Suwon-si (KR); Soon-Young Yoon, Seoul (KR); Young-Hoon Kwon, Seongnam-si (KR); Yong-Seok Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1111 days.

(21) Appl. No.: 11/433,680

(22) Filed: May 12, 2006

(65) Prior Publication Data

US 2006/0259969 A1    Nov. 16, 2006

(30) Foreign Application Priority Data

May 13, 2005    (KR)    .................... 10-2005-0040343

(51) Int. Cl.
*H04M 1/66*    (2006.01)
*H04L 9/32*    (2006.01)
(52) U.S. Cl. .................... 455/411; 713/168; 455/435.1; 709/227; 709/229; 709/203
(58) Field of Classification Search ................ 455/410, 455/435.1, 432.1, 417, 423, 411, 461, 544, 455/544.1, 555; 713/150, 168–181; 370/310, 370/331, 352, 395.31, 395.54, 395.3, 401, 370/386, 310.1; 709/227, 205, 203, 224, 709/229

See application file for complete search history.

(56) References Cited

U.S. PATENT DOCUMENTS

| | | | | |
|---|---|---|---|---|
| 5,148,479 A * | 9/1992 | Bird et al. | .................... | 713/155 |
| 6,353,891 B1 * | 3/2002 | Borella et al. | ................. | 726/12 |
| 6,510,153 B1 * | 1/2003 | Inoue et al. | ................. | 370/354 |
| 6,769,000 B1 * | 7/2004 | Akhtar et al. | ..................... | 1/1 |
| 6,954,790 B2 * | 10/2005 | Forslow | ..................... | 709/227 |

(Continued)

FOREIGN PATENT DOCUMENTS

KR    2001-0022410    3/2001

(Continued)

OTHER PUBLICATIONS

Perkins, IP Mobility Support, Request for Comments: 2002.*

*Primary Examiner*—Lester Kincaid
*Assistant Examiner*—Matthew Sams
(74) *Attorney, Agent, or Firm*—The Farrell Law Firm, LLP

(57) ABSTRACT

Disclosed is a method of preventing a replay attack during a handoff in a communication system using a Mobile IPv6 protocol. A mobile node creates a CoA (Care of Address) by handoff and sends the CoA to a correspondent node, thereby creating a binding entry. Upon receipt of a binding update message including a HoA and a CoA from the mobile node or an attacker, the correspondent node searches a binding cache for a binding entry having the same HoA (Home Address) and CoA as included in the binding update message. If it is determined that the binding entry has the same respective HoA and CoA as contained in the binding update message, the correspondent node checks a Used field of the binding entry. If it is determined that the Used field of the binding entry is equal to a predetermined value, the correspondent node sends a reauthentication command message to the mobile node.

18 Claims, 5 Drawing Sheets

U.S. PATENT DOCUMENTS

| | | | |
|---|---|---|---|
| 6,992,995 B2 * | 1/2006 | Agrawal et al. | 370/328 |
| 7,116,668 B2 * | 10/2006 | Sivalingham | 370/394 |
| 7,545,766 B1 * | 6/2009 | Muhanna et al. | 370/328 |
| 7,546,456 B2 * | 6/2009 | Le et al. | 713/162 |
| 7,636,569 B2 * | 12/2009 | Le et al. | 455/435.1 |
| 2002/0167922 A1 * | 11/2002 | Inoue et al. | 370/331 |
| 2003/0067921 A1 * | 4/2003 | Sivalingham | 370/394 |
| 2003/0161287 A1 * | 8/2003 | Venkitaraman et al. | 370/338 |
| 2004/0008845 A1 * | 1/2004 | Le et al. | 380/277 |
| 2004/0029584 A1 * | 2/2004 | Le et al. | 455/432.1 |
| 2004/0179536 A1 * | 9/2004 | Thubert et al. | 370/395.52 |
| 2004/0236937 A1 * | 11/2004 | Perkins et al. | 713/150 |
| 2005/0079869 A1 * | 4/2005 | Khalil et al. | 455/435.1 |

FOREIGN PATENT DOCUMENTS

| | | |
|---|---|---|
| KR | 1020030018266 | 3/2003 |
| KR | 2003-0038915 | 5/2003 |

* cited by examiner

METHOD OF PREVENTING REPLAY ATTACK IN MOBILE IPV6

PRIORITY

This application claims priority under 35 U.S.C. §119 to an application entitled "Method Of Preventing Replay Attack In Mobile IPv6" filed in the Korean Intellectual Property Office on May 13, 2005 and assigned Serial No. 2005-40343, the contents of which are incorporated herein by reference.

BACKGROUND OF THE INVENTION

1. Field of the Invention

The present invention relates generally to a method of preventing a relay attack in a communication system using a Mobile Internet Protocol version 6 (IPv6) environment, and in particular, to a method of preventing replay attack during a binding updating process that a mobile host (herein referred to as a Mobile Node (MN)) performs to communicate with a Correspondent Node (CN).

2. Description of the Related Art

The recent wide use of the Internet, the development of wireless communication technologies, and the improved performance of mobile terminals such as portable computers and Personal Digital Assistants (PDAs) are driving forces behind the increase of wireless Internet users. In this context, a variety of methods have been proposed to provide high-quality communication services to MNs which roam in a wireless Internet environment.

Mobile IP has emerged as one of the high-quality communication service providing methods, which enables an MN to change its point of attachment to the Internet from one network to another. Mobile IPv4 and Mobile IPv6 are defined according to Mobile IP versions. Mobile IPv6 an extension of Mobile IPv4.

In the Mobile IPv6 environment (hereinafter Mobile IPv6), when an MN moves to a foreign network, the foreign network allocates a temporary address known as a Care of Address (CoA) to the MN. The MN binds the CoA and its own Home Address (HoA) and registers them with a Home Agent (HA) and a CN. Thus, the MN communicates with the CN. Binding is a process of corresponding the temporary CoA to the original address e.g., the (HoA) as information registered with the HA and the CN, when the MN attaches to the foreign network.

During handoff in the Mobile IPv6 environment, the CoA of the MN can be exposed to an attacker, thus vulnerable to replay a "attack".

FIG. 1 is a block diagram illustrating a conventional replay attack procedure. In step 101, an MN transmits a Binding Update to a CN to communicate with the CN. During the binding update, the MN registers its CoA (CoA1) to the binding cache of the CN, thereby creating a new binding entry. As the MN moves, it receives a new CoA (CoA2) by Mobile IPv6 address auto-configuration in step 103. In step 105, the MN transmits CoA2 to the CN, thus creating another new binding entry, for seamless communications with the CN. Referring to FIG. 2, the binding entry includes a HoA 201, a CoA 203, a Life Time 205 representing the valid duration of the binding, and a Maximum Sequence Number 207 indicating the maximum value of the Sequence Number field sent in previous Binding Updates to the CN.

In step 107, an attacker attempts a replay attack on the CN using COA1 and the HoA of the MN at the previous location of the MN.

If the attacker requests a binding update to the CN using CoA1 and the HoA of the MN, the CN determines whether a nonce (a random number) used for generating a previous binding management key for the MN is valid in step 109. If the nonce is valid, the attacker can acquire the binding management key. In other words, the MN and the CN are vulnerable to replay attack from the attacker.

As described above, when the attacker attacks using the CoA1 and the HoA of the MN, if the nonce used for generating the binding management key is still valid, the attacker can initiate the replay attack. Accordingly, there exists a need for preventing the replay attack.

SUMMARY OF THE INVENTION

An object of the present invention is to substantially solve at least the above problems and/or disadvantages and to provide at least the advantages below. Accordingly, an object of the present invention is to provide a method of preventing replay attack from an attacker in a Mobile environment, particularly in a Mobile IPv6 environment Another object of the present invention is to provide a method of preventing replay attack from an attacker by improving a binding updating control operation and a data structure in the Mobile IPv6 environment, particularly in a Mobile environment.

The above objects are achieved by providing a method of preventing replay attack during handoff in the Mobile IPv6 environment, particularly in a Mobile environment.

According to one aspect of the present invention, a method for preventing a replay attack during handoff in a Mobile IPv6 environment, includes in a correspondent node, if a binding life time of a mobile node is equal to 0 and a nonce generated for generating a previous binding management key for the mobile node is valid, a Used field of a binding entry set for the mobile node is set to a predetermined value; upon receipt of a binding update message from the mobile node or an attacker, it is determined whether a binding entry having the same HoA (Home Address) and CoA (Care of Address) as the HoA and CoA included in the binding update message exists in a binding cache; the binding entry includes the same HoA and CoA as those contained in the binding update message, the Used field of the searched binding entry is checked, and f it is determined that the Used field of the binding entry corresponds to the predetermined value, a reauthentication command message is sent to the mobile node to prevent the replay attack.

According to another aspect of the present invention, a method of preventing a replay attack during handoff in a Mobile IPv6 environment includes creating, in a mobile node, a CoA (Care of Address) by handoff and transmitting a binding update message to a correspondent node using the CoA; and performing reauthentication, upon receipt of a reauthentication command message from the correspondent node.

According to a further aspect of the present invention, a method for preventing a replay attack during handoff in Mobile IPv6 environment includes creating a CoA (Care of Address) by handoff and transmitting the CoA to a correspondent node, to create a binding entry; receiving, by a correspondent node, a binding update message including a HoA (Home Address) and CoA (Care of Address) from the mobile node or an attacker, and searching a binding cache for a binding entry having the same HoA and CoA as in the binding update message; if the binding entry having the same HoA and CoA as those included in the binding update message exists, the correspondent node checks the Used field of the binding entry; And if the Used field of the binding entry corresponds to a predetermined value, the correspondent node sends a reauthentication command message to the mobile node.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method of preventing replay attack from an attacker in a Mobile IPv6 Environment. According to the present invention, when an MN roams, a replay attack that an attacker attempts using the HoA of a MN and a CoA (e.g., CoA1) assigned to the MN before the MN roams, is prevented. The replay attack is an attack method in which the attacker eavesdrops network data and re-uses the network data as necessary. In the present invention, it is assumed that the attacker attempts an unauthorized binding update using a previously assigned CoA (e.g., CoA1 and the HoA of the MN.

Figure 1:
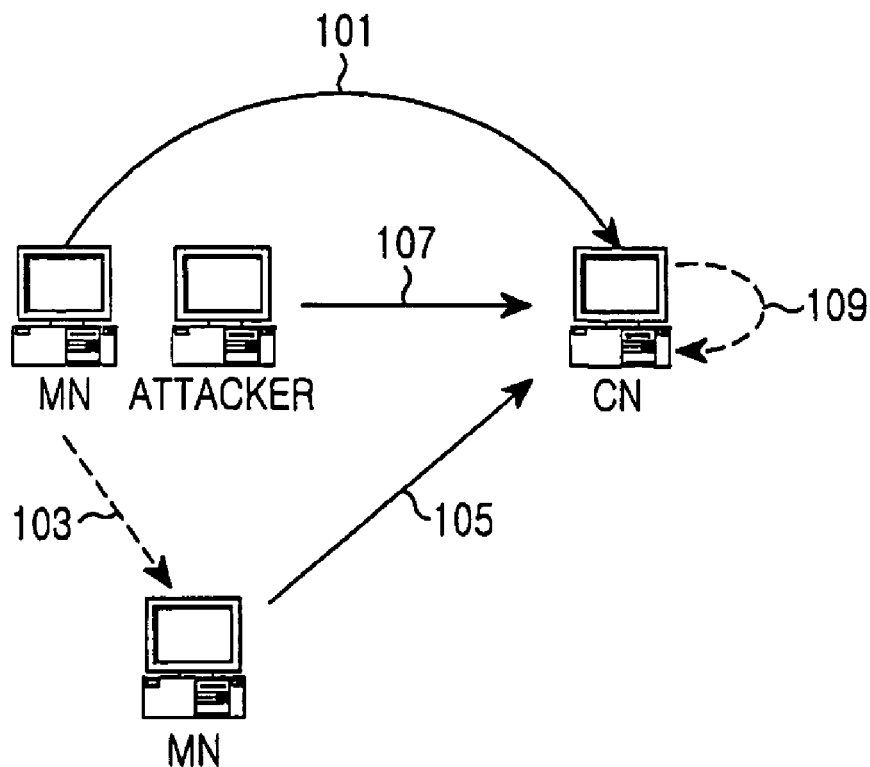
FIG. 1 is a block diagram illustrating a conventional replay attack procedure.
Figure 2:
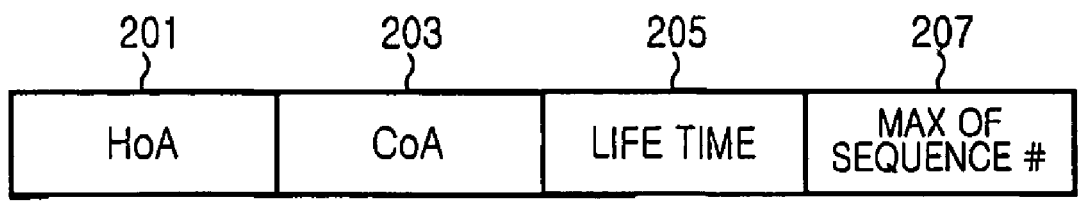
FIG. 2 is a diagram illustrating structure of a conventional binding cache of a CN.
Figure 3:
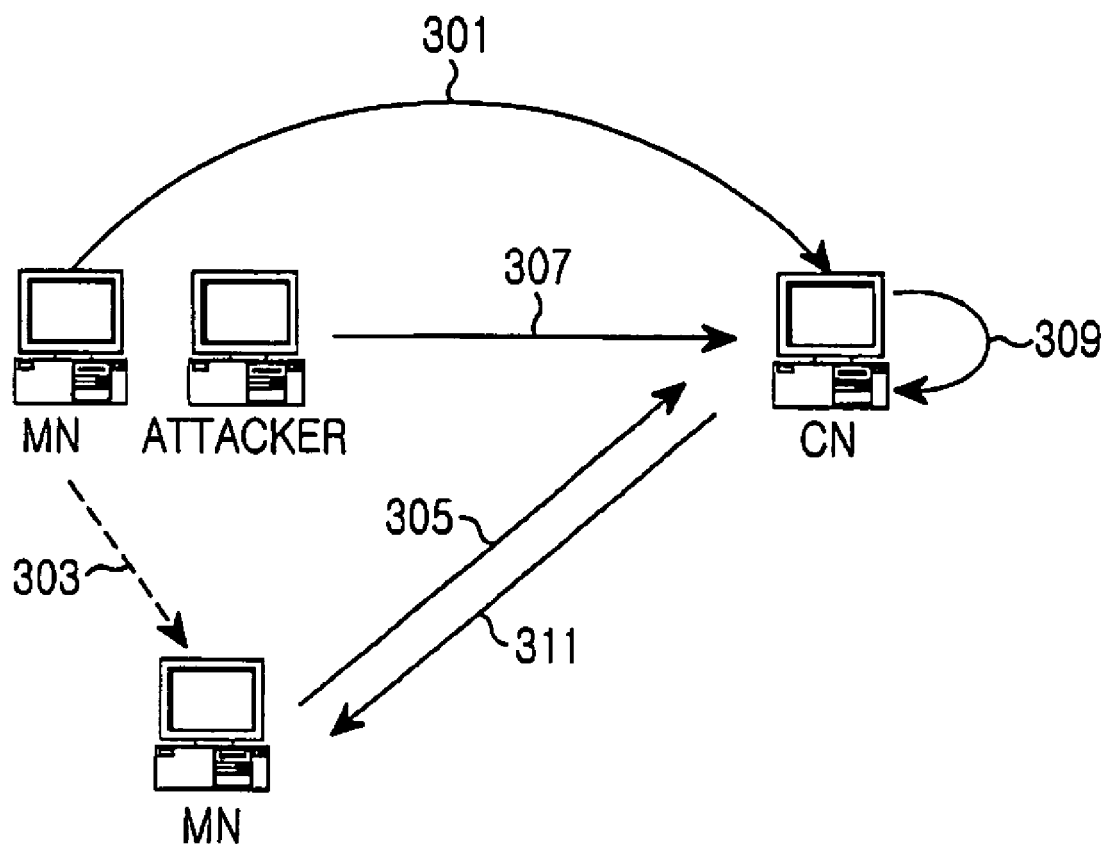
FIG. 3 is a block diagram illustrating an operation for preventing replay attack according to the present invention.

FIG. 3 is a block diagram illustrating an operation for preventing replay attack according to an embodiment of the present invention. Referring to FIG. 3, an MN transmits a Binding Update to a CN to communicate with the CN in step 301. During the binding update, the MN registers its CoA (CoA1) to the binding cache of the CN.

As the MN moves, it receives a new CoA (i.e., CoA2) by an Mobile IPv6 address auto-configuration in step 303.

Figure 6A:
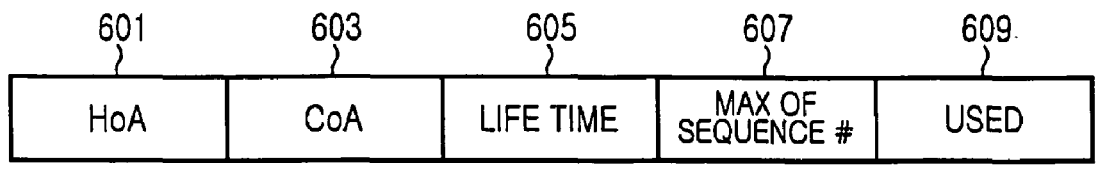
FIG. 6A is a diagram illustrating a the structure of a binding cache used for preventing replay attack according the present invention.

In step 305, the MN sends the CoA2 to the CN, thus creating a new binding entry, for seamless communications with the CN. Referring to FIG. 6A, the binding entry includes the following fields. A HoA 601, a CoA 603, a Life Time 605 representing the valid duration of the binding, a Maximum Sequence Number 607 indicating the maximum value of the Sequence Number field sent in previous Binding Updates to the CN, and a Used 609 indicating whether the binding entry has been used according to the present invention. If the Life Time 605 is 0 and a nonce used for generating a binding management key is still valid, the Used 609 is set to 1 to indicate that the binding entry has been used.

When an attacker attempts a replay attack on the CN using a previously assigned CoA (e.g., (CoA1) and the HoA of the MN at the previous location of the MN, that is, when the attacker sends a Binding Update to the CN using CoA1 and the HoA in step 307, the CN determines whether a binding entry corresponding to the HoA exists in the CN's binding cache. If it is determined that the binding entry corresponding to the HoA of the MN exists, the CN compares the CoA of the binding entry with CoA1. If it is determined that the binding entry has the same HoA and CoA1 as those set in the Binding Update, the CN checks whether the Used field 609 in the binding entry is set to a predetermined value (e.g., 1).

Figure 6B:
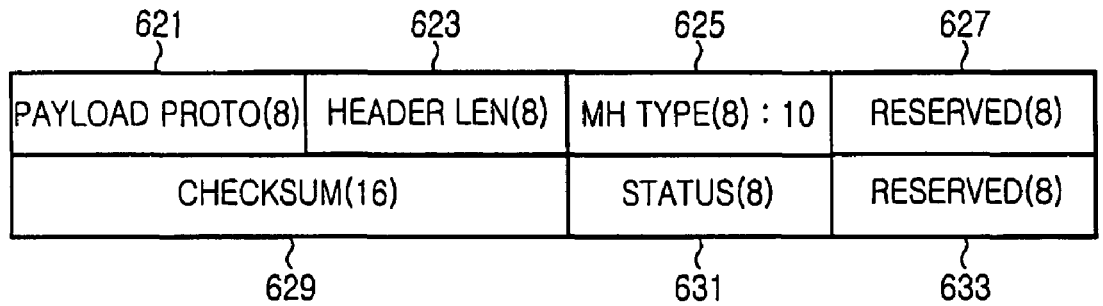
FIG. 6B is a diagram illustrating a the structure of a reauthentication command message according to the present invention.

If it is determined that the Used field 609 is set to the predetermined value (e.g., to 1) which implies that the binding entry has been used), the CN sends a reauthentication command message to the MN, for re-authentication because the binding entry is vulnerable to replay attack from the attacker, in step 311. Referring to FIG. 6B, the reauthentication command message includes the following fields. Payload Proto 621 indicating a type of an IPv6 header following a Mobility Header, a Header Length (Len) 623 being an 8-bit unsigned integer indicating the length of the Mobility Header, a Mobility Header (MH) Type 625 identifying the Mobility message, 8-bit Reserved fields 627 and 633, a Checksum 629 expressed as a 16-bit unsigned integer for checking errors in the Mobility Header, and the Status 631. To command reauthentication, the MH Type field 625 is set to 10 and the Status 631 field is additionally provided. The Status field 631 is an 8-bit unsigned integer, which notifies of the likelihood of an attack. For example, if the Status 631 is set to a predetermined number (foe example, 3), this implies that replay attack is highly probable and thus a binding update is requested by commanding reauthentication based on a new nonce.

Figure 4:
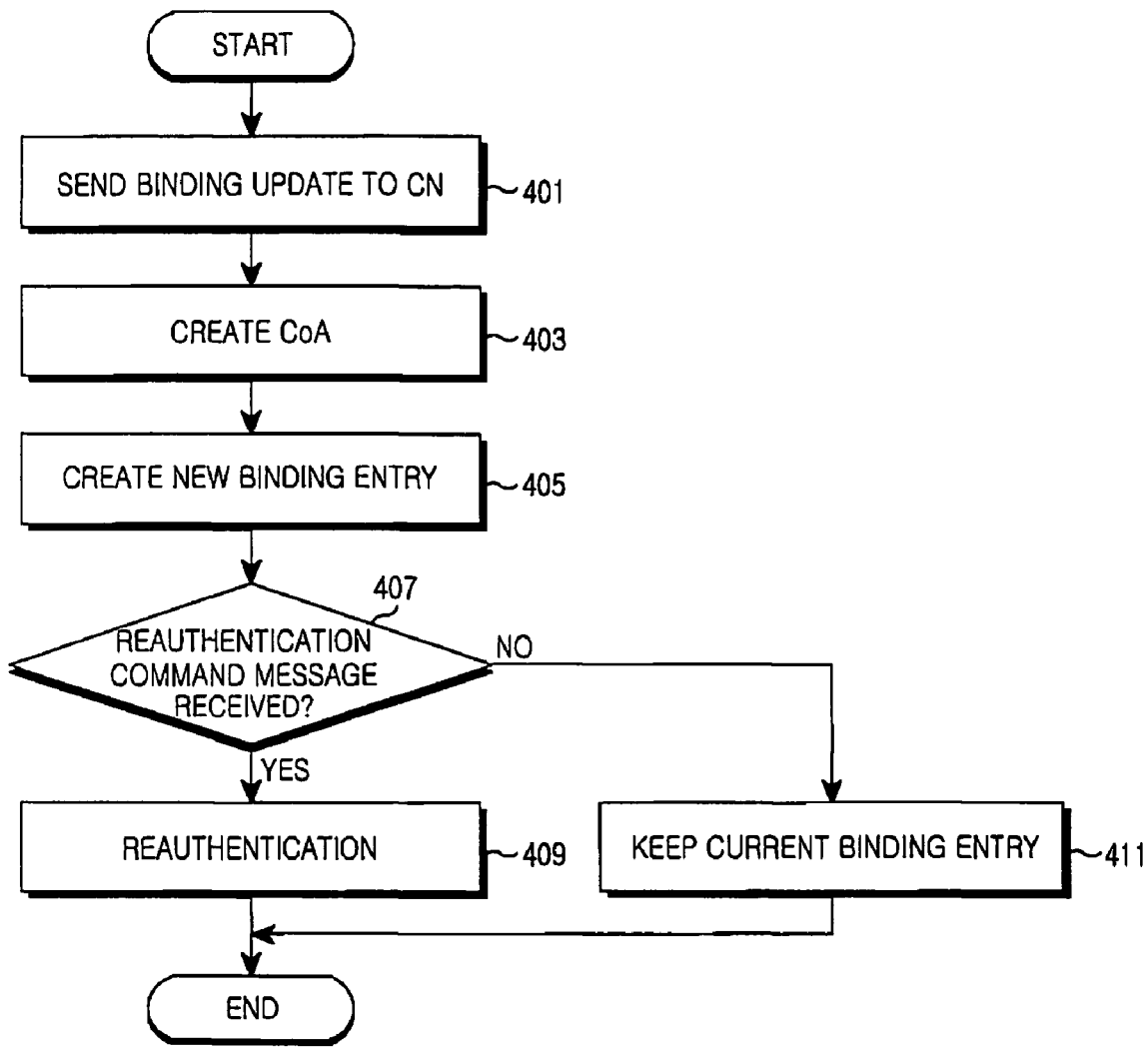
FIG. 4 is a flowchart illustrating an operation of an MN for preventing replay attack according to the present invention.

FIG. 4 is a flowchart illustrating an operation of an MN for preventing a replay attack according to the present invention. Referring to FIG. 4, the MN transmits a Binding Update to a CN to communicate with the CN in step 401. During the binding update, the MN registers its CoA (CoA1) to the binding cache of the CN.

As the MN moves, it receives a new CoA (CoA2) by the Mobile IPv6 address auto-configuration in step 403. In step 405, the MN transmits CoA2 to the CN, thus creating a new binding entry, for seamless communications with the CN. At the same time, the Used field of the binding entry is sent to indicate that the binding entry has been used, for protecting the binding entry against replay attack.

In step 407, the MN monitors reception of a reauthentication command message from the CN. The reauthentication command message is used to command reauthentication due to a probable replay attack from an attacker. In the absence of the reauthentication command message, the MN maintains the current binding entry in step 411. However, upon receipt of the reauthentication command message, the MN performs authentication in step 409.

Figure 5:
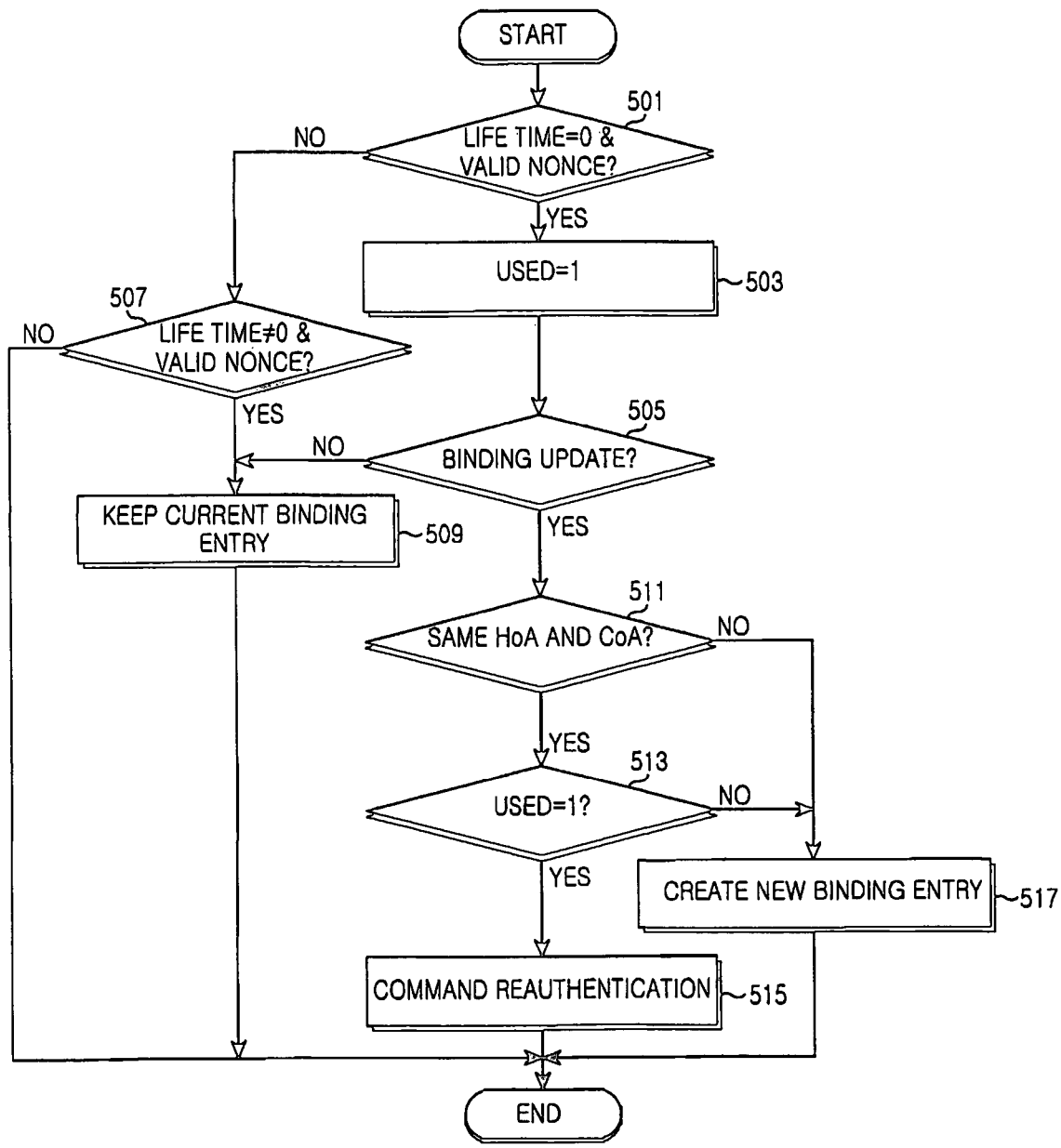
FIG. 5 is a flowchart illustrating an operation of a CN for preventing replay attack according to the present invention.

FIG. 5 is a flowchart illustrating an operation of a CN for preventing a replay attack according to the present invention.

Referring to FIG. 5, the CN determines whether the binding lifetime of an MN expires (e.g., is equal to 0), and whether a nonce used for generating a previous binding management key for the MN is still valid in step 501. If both the requirements (i.e., life time=0 and nonce is valid) are not fulfilled, the CN determines whether the life time is not equal to 0 and the nonce is valid in step 507. If the nonce is not equal to 0 and the nonce is valid, the CN maintains a current binding entry in step 509. If the nonce is invalid, the CN ends this algorithm. On the other hand, if the life time is equal to 0 and the nonce is valid, the CN sets the Used field to 1 in step 503.

In step 505, the CN monitors receipt of a Binding Update from the MN or an attacker. In the absence of the Binding Update, the CN maintains the current binding entry in step 509 and thereafter ends the procedure.

On the contrary, upon receipt of the Binding Update, the CN searches its binding cache for a binding entry having the same HoA and CoA as those set in the Binding Update in step 511. In the absence of the binding entry, the CN creates a new binding entry according to the HoA and CoA included in the Binding Update in step 517 and ends the algorithm.

However, in the presence of the binding entry in the Binding Update in step 511, the CN checks whether the Used field 609 of the binding entry is equal to 1 in step 513. If the Used field 609 is not equal to 1, the CN creates a new binding entry according to the HoA and CoA included in the Binding Update in step 517 and ends the procedure.

If the Used filed 619 is equal to 1, the CN sends a reauthentication command message to the MN because a replay attack is likely to occur, in step 515 and ends the procedure.

In accordance with the present invention as described above, when an attacker sends a Binding Update to a CN using the HoA and pre-roaming CoA of an MN during handoff of the MN under the Mobile IPv6 environment, the CN determines from the Used field of a binding cache for the MN that the CN is vulnerable to a replay attack. Thus, the CN sends a reauthentication command message to the MN, thereby preventing replay attack from the attacker.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of preventing a replay attack in a Mobile IPv6environment in a correspondent node, the method comprising:
    setting a Used field of a binding entry set for a mobile node to a predetermined value, if a binding life time of the mobile node is equal to 0 and a nonce generated for generating a previous binding management key for the mobile node is valid;
    searching, upon receipt of a binding update message from the mobile node or an attacker, a binding cache, and determining whether a binding entry, included in the binding cache, having the same Home Address (HoA) and Care of Address (CoA) as included in the binding update message exists;
    determining whether the Used field of the binding entry is equal to the predetermined value, if it is determined that a binding entry having the same HoA and CoA as included in the binding update message exists; and
    sending a reauthentication command message to the mobile node, if it is determined that the Used field of the binding entry is equal to the predetermined value.

2. The method of claim 1, further comprising creating a new binding entry in response to the binding update message, if it is determined that a binding entry having the same HoA and CoA as included in the binding update message does not exist.

3. The method of claim 1, further comprising creating a new binding entry in response to the binding update message, if it is determined that the Used field of the binding entry is not equal to the predetermined value.

4. The method of claim 1, wherein the Used field indicates whether the HoA and CoA of the binding entry have been previously used.

5. The method of claim 1, wherein the reauthentication command message includes a status Field and is used for commanding the performance of a reauthentication when a replay attack is probable.

6. The method of claim 5, wherein the status field includes information indicating the probability of the replay attack.

7. A method of preventing a replay attack in a Mobile IPv6 environment, the method comprising:
    creating a care of address (CoA) by handoff and sending the CoA to a correspondent node, thereby creating a binding entry by a mobile node;
    searching, by the correspondent node, upon receipt of a binding update message from the mobile node or an attacker, a binding cache and determining whether a binding entry, included in the binding cache, having the same home address (HoA) and care of address (CoA) as included in the binding update message exists;
    determining, by the correspondent node, whether a Used field of the binding entry is equal to a predetermined value, if it is determined that the binding entry having the same HoA and CoA as included in the binding update message exists; and
    sending, by the correspondent node, a reauthentication command message to the mobile node, if the Used field of the binding entry is determined to be equal to the predetermined value.

8. The method of claim 7, further including creating a new binding entry in response to the binding update message, if it is determined that a binding entry having the same HoA and CoA as included in the binding update message does not exist.

9. The method of claim 7, wherein the Used field indicates whether the HoA and CoA of the binding entry have been previously used.

10. The method of claim 7, wherein the reauthentication command message includes a status field and is used for commanding the performance of a reauthentication when a replay attack is probable.

11. The method of claim 10, wherein the status field includes information indicating the replay attack possibility.

12. A method of preventing a replay attack in a mobile Internet communication System in a correspondent node, the method comprising:
    setting a Used field of a binding entry set for a mobile node to a predetermined value, if binding life time of the mobile node is equal to 0 and a nonce generated for generating a previous binding management key for the mobile node is valid;
    searching, upon receipt of a binding update message from the mobile node or an attacker, a binding cache, and determining whether a binding entry, included in the binding cache, having the same home address (HoA) and care of address (CoA) as included in the binding update message exists;
    determining whether the Used field of the binding entry is equal to the predetermined value, if it is determined that a binding entry having the same HoA and CoA as included in the binding update message exists; and
    sending a reauthentication command message to the mobile node, if it is determined that the Used field of the binding entry is equal to the predetermined value.

13. The method of claim 12, further comprising: creating a new binding entry in response to the binding update message, if it is determined that a binding entry having the same HoA and CoA as included in the binding update message does not exist.

14. The method of claim 12, further comprising creating a new binding entry in response to the binding update message, if it is determined that the Used field of the binding entry is not equal to the predetermined value.

15. The method of claim 12, wherein the reauthentication command message includes a status field is used for and commanding that reauthentication when a replay attack is probable.

16. A method of preventing a replay attack in a Mobile Internet system, the method comprising:
   creating a care of address (CoA) in the course of handoff and sending the CoA to a correspondent node, thereby creating a binding entry by a mobile node;
   searching, by the correspondent node, upon receipt of a binding update message from the mobile node or an attacker, a binding cache, and determining whether a binding entry, included in the binding cache, having the same home address (HoA) and care of address (CoA) as included in the binding update message exists;
   determining, by the corresponding node, whether a Used Field of the searched binding entry is equal to a predetermined value, if it is determined that a binding entry having the same HoA and CoA as included in the binding update message exists; and
   sending a reauthentication command message to the mobile node by the correspondent node, if it is determined that the Used field of the binding entry is equal to the predetermined value.

17. The method of claim 16, wherein the Used field indicates whether the HoA and CoA of the binding entry have been previously used.

18. The method of claim 16, wherein the reauthentication command message includes a status field and is used for commanding the performance of that reauthentication when a replay attack is probable.

* * * * *